(12) United States Patent
Wosk et al.

(10) Patent No.: US 9,544,409 B2
(45) Date of Patent: *Jan. 10, 2017

(54) AUTOMATED CALLER IDENTIFIER FROM CONTACT LISTS OF A USER'S CONTACTS

(71) Applicant: MICROSOFT TECHNOLOGY LICENSING, LLC, Redmond, WA (US)

(72) Inventors: Michal Wosk, Tel Aviv (IL); Alexander Losovsky, Hadera (IL); Dror Zelber, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,806

(22) Filed: Apr. 26, 2016

(65) Prior Publication Data

US 2016/0241692 A1    Aug. 18, 2016

Related U.S. Application Data

(63) Continuation of application No. 14/030,934, filed on Sep. 18, 2013, now Pat. No. 9,369,850, which is a
(Continued)

(51) Int. Cl.
*H04M 1/2745* (2006.01)
*H04M 3/42* (2006.01)

(52) U.S. Cl.
CPC ... *H04M 1/274516* (2013.01); *H04M 1/27455* (2013.01); *H04M 1/274508* (2013.01);
(Continued)

(58) Field of Classification Search
CPC ............. H04M 1/274516; H04M 1/274533; H04M 3/42382; H04M 1/274508; H04M 1/27455; H04M 3/42042
See application file for complete search history.

(56) References Cited

U.S. PATENT DOCUMENTS 8,949,339 B2    2/2015  Serlet
2005/0027716 A1    2/2005  Apfel
(Continued)

FOREIGN PATENT DOCUMENTS

| CN | 1817023 A | 8/2006 |
| CN | 10 1304575 | 11/2008 |
| EP | 1241 573 A2 | 9/2002 |

OTHER PUBLICATIONS

CN Notice on Grant of Patent Right for Invention for Application No. 201310455172.3, Jan. 21, 2016.
(Continued)

*Primary Examiner* — Joseph Dean, Jr.
(74) *Attorney, Agent, or Firm* — Judy Yee; L. Alan Collins; Micky Minhas (57) ABSTRACT

When a call or message is received from an unidentified sender on the user's communication device, the caller identifier application launches a text-based messaging application and causes it to send an "invisible" text-based message to the user's contacts. The message includes the metadata (e.g., telephone number) associated with the call or message that the user received. The invisible message is a short message whose headers are programmed in a particular manner so that the receiving mobile phone acknowledges the receipt of the message and the receiving mobile phone displays no behavior perceptible by the user. When the invisible message is received by the corresponding caller identifier application on one of the user's contact's mobile phone, the application searches the contact's contact list maintained in his or hers contact application. If the metadata provided to the contact's mobile phone is located in the
(Continued)

contact list, the contact details (e.g. Name) or the contact card, if available, is sent back to the user's mobile phone in a second invisible message. Upon receiving the second invisible message, the caller identifier application causes some or all of the contact details to be displayed on the user's mobile phone or otherwise presented to the user in any appropriate manner.

20 Claims, 7 Drawing Sheets

Related U.S. Application Data continuation of application No. 12/706,803, filed on Feb. 17, 2010, now Pat. No. 8,543,144.

(52) U.S. Cl.
CPC . *H04M 1/274533* (2013.01); *H04M 3/42042* (2013.01); *H04M 3/42382* (2013.01)

(56) References Cited

U.S. PATENT DOCUMENTS

| 2005/0059418 | A1 | 3/2005 | Northcutt |
| 2006/0052091 | A1 | 3/2006 | Onyon |
| 2006/0209740 | A1 | 9/2006 | Anza Hormigo et al. |
| 2006/0229063 | A1 | 10/2006 | Koch |
| 2007/0010264 | A1* | 1/2007 | Sun .................. H04W 4/22 455/466 |
| 2007/0053335 | A1 | 3/2007 | Onyon |
| 2008/0275865 | A1 | 11/2008 | Kretz |
| 2011/0176670 | A1 | 7/2011 | Kaplan |
| 2012/0149347 | A1 | 6/2012 | Scott |

OTHER PUBLICATIONS

CN Notice on the First Office Action for Application No. 201310455172.3, Aug. 14, 2015.
"Contacts Express (1.1)", Oct. 5, 2009, pp. 5.
Reuters, "Automatic Mobile Contacts Update Soon?", Oct. 31, 2006.
Segan, Sascha, "Helio Ocean 2 (Virgin Mobile)", Feb. 2, 2009.
Chinese Office Action issued Nov. 29, 2012 in connection with corresponding Chinese Patent Application No. 201110043186.5.
CN Notice on the Second Office Action for Application No. 201110043186.5, Apr. 24, 2013.
CN Notice on the Third Office Action for Application No. 201110043186.5, Jul. 24, 2013.

* cited by examiner

AUTOMATED CALLER IDENTIFIER FROM CONTACT LISTS OF A USER'S CONTACTS

RELATED APPLICATION

This application is a Continuation of and claims benefit from U.S. patent application Ser. No. 14/030,934 that was filed Sep. 18, 2013, and that is a Continuation of U.S. patent application Ser. No. 12/706,803 (U.S. Pat. No. 8,543,144), filed Feb. 17, 2010 (issued Sep. 24, 2013), each of which is incorporated herein by reference in its entirety.

BACKGROUND

Modern communication networks have provided users with a vast array of features and functions that make staying connected with friends, families, colleagues, and others easy, convenient, and inexpensive. A wide variety of devices such as mobile phones, smart phones, personal computers ("PCs"), and other network-enabled devices are available which let users surf the Web to access sources of information and entertainment, send e-mails and instant messages, as well as communicate using voice calls to other users. Moreover, as wireless infrastructure has broadened its reach, and as devices become feature-rich, smaller, and more portable, users can be reached virtually at any time and at any place.

While most users appreciate the benefits of such heightened connectivity, which often leads to the receipt of a large volume of calls and messages vying for the user's attention, it is helpful if the name of the incoming caller can be presented to the user upon receipt of the call or message. Such a feature can be provided by examining metadata associated with the incoming call or message such as the sender's telephone number. The metadata can be compared to the data in the user's contact list and if a match is found, the name of the sender is presented to the user on the display of the mobile phone. As a consequence of the heightened connectivity offered by mobile phones, users more and more frequently may receive calls or messages from an unidentified sender whose name is not included in the user's list of contacts. It would be helpful to the user if more of these unidentified senders could be automatically identified when the call or message is received, even if they are not included in the user's contact list.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

As previously mentioned, some users, particularly enterprise users, can receive many calls or messages on their mobile phone from various senders, some of whom can be identified from the user's contact list and others of whom cannot be identified. While users may be received calls or messages from unidentified senders who are not included in the user's contact list, such senders sometimes may be included in the contact list of one or more of the user's contacts. In one implementation, in order to leverage the information available in the contact lists of the user's contacts, the user's electronic communication device such as a mobile phone or the like includes a caller identifier application for identifying unidentified senders. The caller identifier application is configured to search the contact list residing on the user's communication device. If the sender's name or other identifier is not found, the caller identifier application is also configured to determine if the identity of the unidentified sender is available from a contact list residing on the communication devices of those contacts who are included in the user's contact list and to fetch the identity of the sender so that it can be presented to the user.

In one particular implementation, when a call or message is received from an unidentified sender on the user's communication device, the caller identifier application launches a text-based messaging application and causes it to send an "invisible" text-based message to the user's contacts. The message includes the metadata (e.g., telephone number) associated with the call or message that the user received. The invisible SMS message is a short message whose headers are programmed in a particular manner so that the receiving mobile phone acknowledges the receipt of the message and the receiving mobile phone displays no behavior perceptible by the user. When the invisible message is received by the corresponding caller identifier application on one of the user's contact's mobile phone, the application searches the contact's contact list maintained in his or hers contact application. If the metadata provided to the contact's mobile phone is located in the contact list, the contact details (e.g. name) or the contact card, if available, is sent back to the user's mobile phone in a second invisible SMS message. Upon receiving the second invisible SMS message, the caller identifier application causes some or all of the contact details to be displayed on the user's mobile phone or otherwise presented to the user in any appropriate manner. In this way the user's contact list is effectively expanded to include his or her contacts' contact list, which can be searched automatically without any intervention on the part of any of the parties involved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
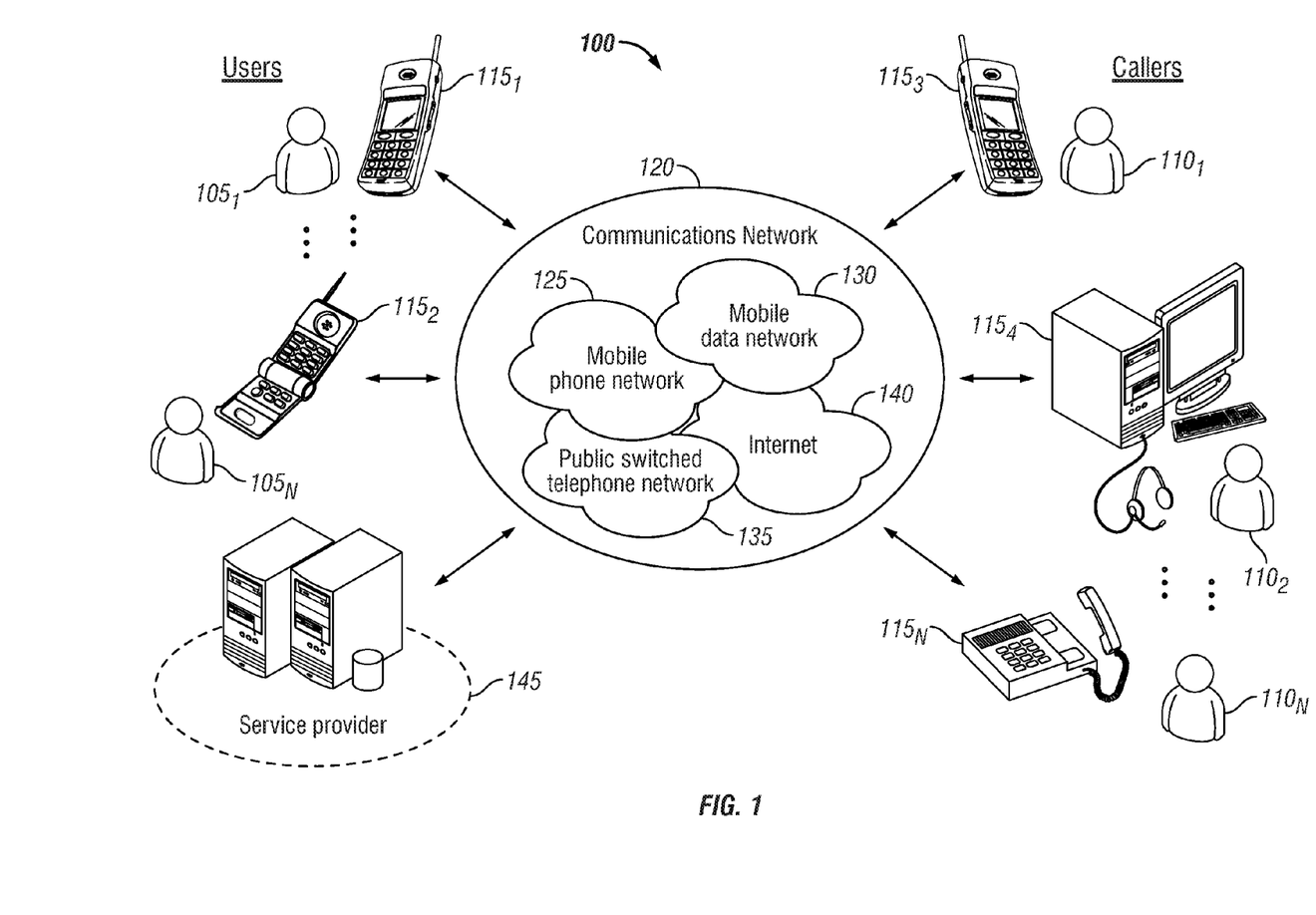
FIG. 1 shows an illustrative communications environment in which device users and callers may communicate using network-enabled devices such as mobile phones, PCs, and landline phones.

In the drawings in which like reference numbers indicate the same element, FIG. 1 shows an illustrative communications environment 100 in which users $105_{1...N}$ and callers $110_{1, 2...N}$ may communicate using respective network-enabled devices $115_{1, 2...N}$ that are each operatively coupled to a communications network 120. The devices 115 may include any of a variety of devices and platforms which support voice communications such as mobile phones, smart phones, PCS, landline telephones, or other mobile or fixed devices that are adapted for voice telephony over a network. In this particular exemplary embodiment, the term "user" refers to a user of the present caller identifier application who receives a phone call, SMS message or the like from a person who will be referred to herein as the "sender."

In one embodiment, the present caller identifier application is arranged to execute on a mobile device such as a mobile phone, telephony-capable personal digital assistant, smartphone, or other portable device (collectively referred to hereafter as a "mobile phone") that is capable of making or receiving voice calls that is configured as a Microsoft Windows® CE-based device. However, the principles of the present arrangement may also be adapted for use with other devices using other operating systems such as the Android™ operating system, for example.

The communications network 120 that is used to facilitate communication among the users 105 and callers 110 may include portions of one or more network types as shown in FIG. 1, including a mobile phone network 125, mobile data network 130, public switched telephone network 135, and internet 140. Therefore, for example, a given caller 110 may call a given user 105 using a conventional telephone where the call is carried over portions of both the public switched telephone network 135 and mobile phone network 125. Alternatively, another caller 110 may call the user 105 using a PC equipped with VOIP (voice over internet protocol) capability where the call is carried over the internet 140 and mobile phone network 125. Indeed, various combinations of network types or single networks can be utilized as may be necessary to transport a given phone call.

A service provider 145 is also supported in the communications environment 100. The service provider 145 may be utilized in usage scenarios in which portions of the present caller identifier application functionality are distributed to one or more external, remotely-located servers. Such usage scenarios are described in more detail below in the text accompanying FIGS. 13 and 14.

Figure 2:
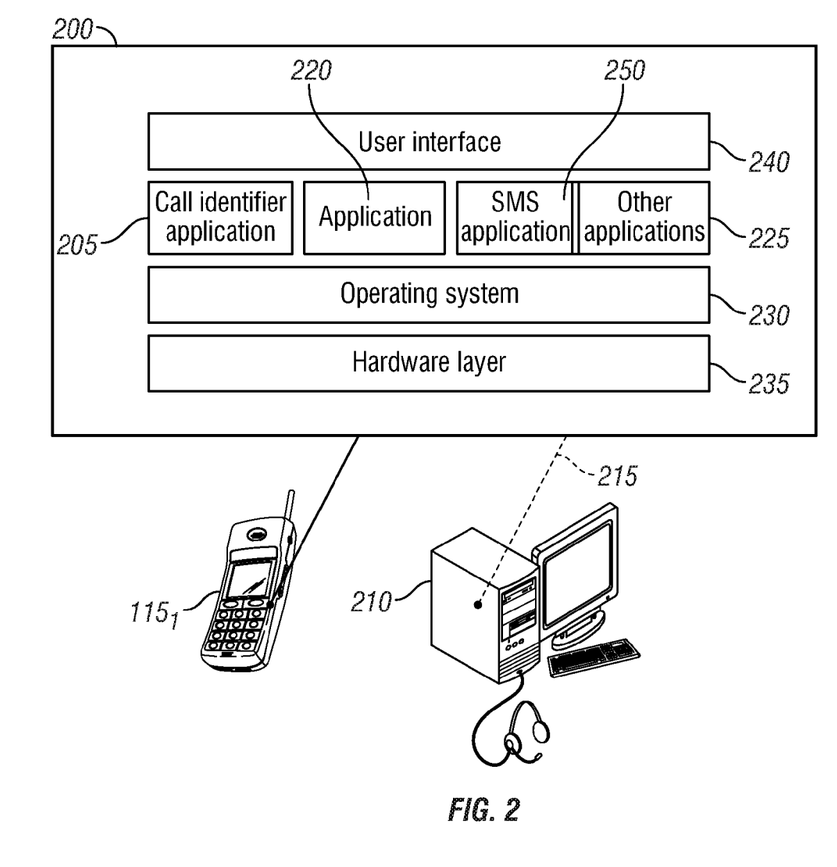
FIG. 2 shows an illustrative architecture, including a caller identifier application, that may be implemented on a network-enabled communication device such as a mobile phone.

FIG. 2 shows an illustrative architecture 200 of major functional components which are used to facilitate the present arrangement, including a caller identifier application 205, that may be implemented on a network-enabled communication device such as a mobile phone $115_1$, as described above. Although the architecture 200 shown in FIG. 2 is particularly adapted for the mobile phone $115_1$, the fundamental principles it illustrates can be expected to have general applicability to other platforms such as, for example, a PC 210, as indicated by the dashed line 215. In this exemplary embodiment, the caller identifier application 205 executes on the mobile phone $115_1$ along with a contacts application 220, SMS application 250 and other applications as collectively indicated by reference number 225. The contacts application 220, which maintains contact information such as addresses, phone numbers, and the like of friends, colleagues, family, etc., may be included in an application that offers functionality in addition to maintaining contacts. For instance, contact lists are often maintained in scheduling applications, which typically support scheduling, calendar, and task management functionality either singly or in combination. Such a contacts or scheduling application may be embodied, for example, in commercially available software such as Microsoft Corporation's Outlook® messaging and collaboration client.

The SMS application 250 supports the short message service, which is a service available on many communication devices that permits the sending of short messages (also known as text messages) between mobile phones, other handheld devices, computers, and even standard landline phones. Wireless networks generally implement SMS with the use of a short message service center (SMSC), which acts as a store-and-forward system for relaying short messages. Messages are stored in the network until the destination communication device becomes available, so an end user can receive or transmit an sms message at any time, whether a voice call is in progress or not. Instead of an SMS application, other text-based messaging applications may be employed. Such an application may send text-based messages in other formats, including, for instance, MMS messages, which are supported by the multimedia messaging service developed by 3GPP (third generation partnership project) for sending multimedia communications between mobile telephones and other forms of wireless information device. Other types of text-based messages that may be employed may be based on any intermediary technology (such as EMS (enhanced message service)) and variants, such as premium SMS, and any future enhancements and developments of these services.

Supporting the applications 205, 220, and 225 in the architecture 200 are an operating system 230 and a hardware layer 235. In this exemplary embodiment, the operating system 230 is particularly adapted to operate on a resource-limited device and may comprise, for example, Microsoft Windows® CE. The hardware layer 235 provides an abstraction of the physical hardware implemented on the device $115_1$ to the operating system 230 and applications 205, 220, and 225 above it. For example, such physical hardware may typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. A UI 240 is also provided by the architecture 200 to support user interactivity and facilitate an effective user experience, and will typically be embodied as a graphical user interface.

Figure 3:
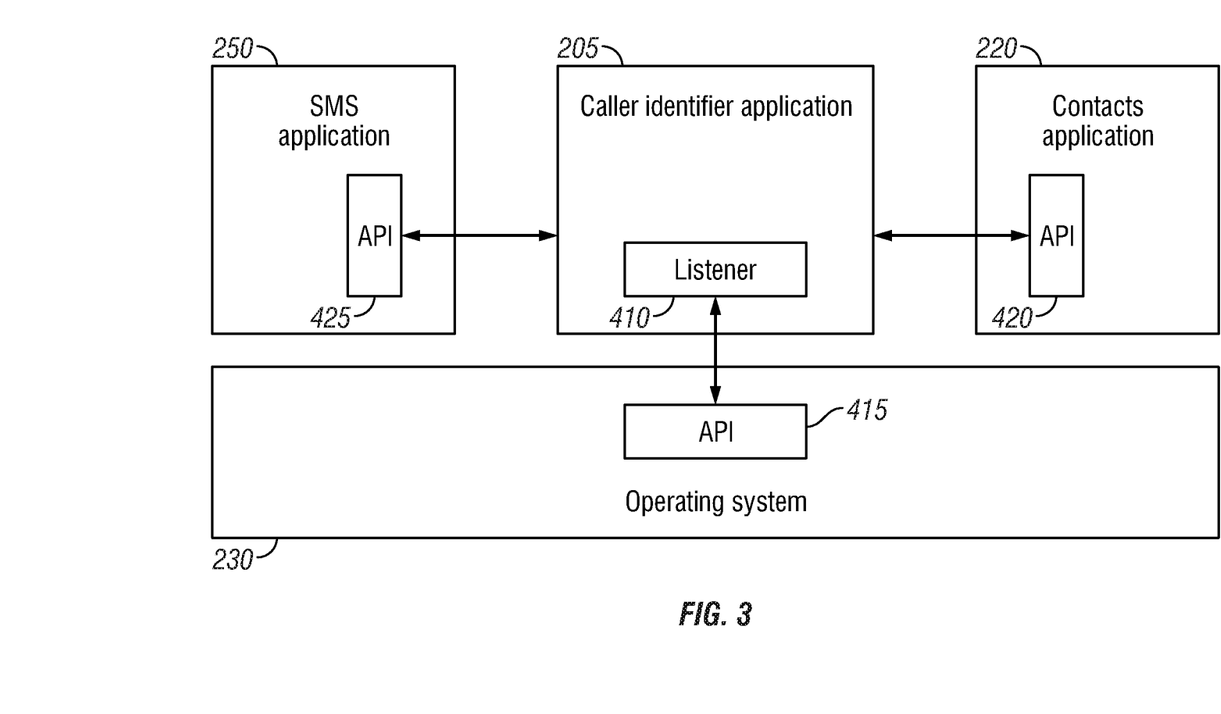
FIG. 3 shows illustrative interfaces that are utilized among various functional components operating on a network-enabled device.

FIG. 3 shows several illustrative interfaces that are implemented among various functional components operating on the mobile phone $115_1$. The caller identifier application 205 will typically register a listener 410 with the operating system 230 through an API 415 in order to monitor call activity on the mobile phone $115_1$. The caller identifier application 205 will also typically interact with other applications executing on the mobile phone $115_1$ by APIs that are respectively exposed by the other applications. For example, as shown in FIG. 3, a representative API 420 which is exposed by contacts schedule application 220 enables the caller identifier application 205 to invoke various functions, pass parameters, and exchange data with the schedule application 220. Likewise, a representative API 425 which is exposed by SMS application 250 enables the caller identifier application 205 to invoke various functions, pass parameters, and exchange data with the SMS application 250.

As previously mentioned, some users, particularly enterprise users, can receive many calls or messages on their mobile phone from various senders, some of whom can be identified from the user's contact list and others of whom cannot be identified. While such unidentified senders may not be included in the user's contact list, they sometimes may be included in the contact list of one or more of the user's contacts. That is, the sender may be someone who is more closely associated with one of the user's contacts than with the user him or herself. This is particularly true given the increasing use of social networking services such as those offered by Facebook, MySpace, LinkedIn and the like, which facilitate the development of extended communities of individuals.

In order to leverage the information available in the contact lists of the user's contacts, when a call or message is received from an unidentified sender, the caller identifier application 205 launches the SMS application 250 and causes it to send an "invisible" SMS message to the user's contacts. The SMS message includes the metadata (e.g., telephone number) associated with the call or message that the user received. An invisible SMS message is a short message whose headers are programmed in a particular manner so that the receiving mobile phone acknowledges the receipt of the message and the receiving mobile phone displays no behavior perceptible by the user. One example of a technique for sending an SMS message in an invisible format is shown in U.S. Publication No. 20060209740. When the invisible message is received by the corresponding caller identifier application on one of the user's contact's mobile phone, the application searches the contact's contact list maintained in his or hers contact application. If the metadata provided to the contact's mobile phone is located in the contact list, the contact details (e.g. name) or the contact card, if available, is sent back to the user's mobile phone in a second invisible SMS message. Upon receiving the second invisible SMS message, the caller identifier application 205 causes some or all of the contact details to be displayed on the user's mobile phone or otherwise presented to the user in any appropriate manner. In this way the user's contact list is effectively expanded to include his or her contacts' contact list, which can be searched automatically without any intervention on the part of any of the parties involved.

Figure 4:
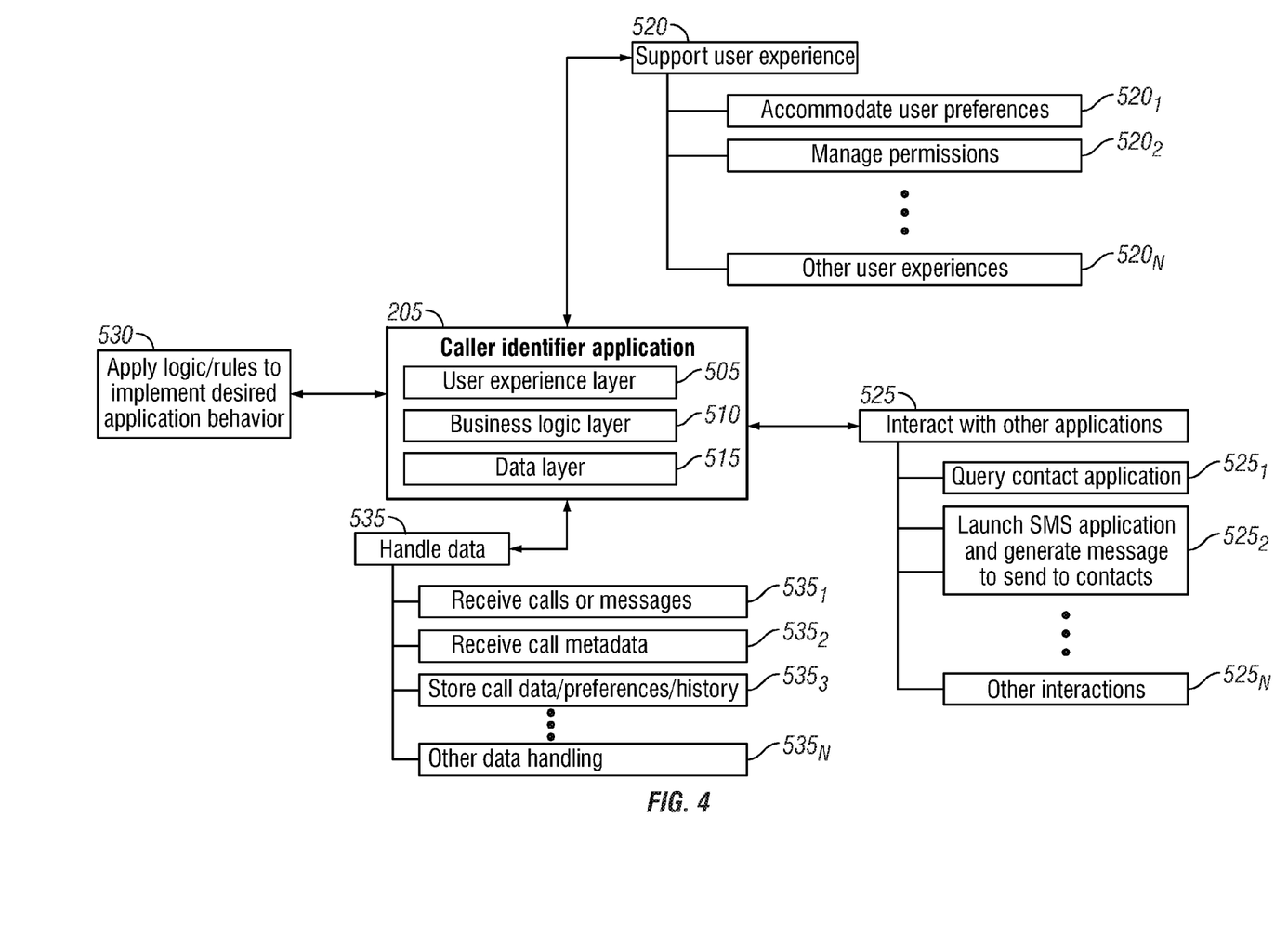
FIG. 4 shows an illustrative set of functional components in the caller identifier application and various illustrative features, functionalities, and interfaces supported by the caller identifier application.

FIG. 4 shows an illustrative set of functional components which comprise the caller identifier application 205. The components include a user experience layer 505, business logic layer 510, and data layer 515. It is particularly pointed out that the functional components shown in FIG. 4 are merely illustrative and that other components may also be used in various combinations depending on the needs of a given scenario and to provide the features and functionalities described herein. The functional components in the caller identifier application 205 are generally configured to support a variety of features, functionalities, and interfaces including supporting a user experience, interacting with other applications, applying logic and rules to implement the desired behavior of the application, and handling data as respectively indicated by reference numbers 520, 525, 530, and 535.

The functional components in the particular exemplary embodiment are of FIG. 4 may be implemented, at least in part, by computer-executable code which is written to one or more storage media that are disposed on the mobile phone $115_1$ and which execute via one or more processors that are included in the phone's hardware. In this regard, accordingly, the arrangement shown is considered as a "thick client" as the code implemented by the functional components executes substantially in its entirety on the mobile phone $115_1$ in order to provide the as-designed user experience and application behavior. In alternative implementations, the functional components are configured in a distributed computing arrangement and the code on the mobile phone $115_1$ will be executed from a thin client. In this case, the functional components and associated code execution are distributed across multiple computing platforms, including the mobile phone $115_1$ and one or more servers operated by the service provider 145 shown in FIG. 1.

As shown, the caller identifier application 205 supports a user experience 520 by accommodating user preferences $520_1$ when a call or message is received from an unidentified sender, managing permissions $520_2$ and other user experiences $520_N$. For instance, the user preferences may include such items as selecting the particular contacts whose contact list should be searched and the order in which they should be searched and the manner in which the results of such a search are to be presented. Permissions may include allowing invisible SMS messages to be received in order to search the user's contact list, selecting certain individuals in the contact list whose identity should not be supplied in response to a request from another user, and whether the user should be asked for permission to release contact information to another user each and every time a query is made. For instance some queries may be automatically authorized based on the contact group. As an example, such proactive authorization may allow all of the user's work colleagues to search contacts in the user's work group.

The caller identifier application 205 may also interact with other applications which execute on the mobile phone $115_1$. In this particular exemplary embodiment, the caller identifier application 205 typically interacts with the contacts application 220 and SMS application 250. However, interactions with other applications may also be utilized in a similar manner as described here. In some usage scenarios, the caller identifier application 205 will implement queries such as querying a contact list $525_1$ to identify a user's contact that is associated with a call event and launching the SMS or other messaging application to generate an invisible SMS message that is to be sent to the user's contact $525_2$. The call identifier application 205 may also interact with other applications and the like $525_N$.

The caller identifier application 205 will generally apply business logic and rules to implement the desired behavior of the application as indicated by reference number 530. Application of the business logic and rules will typically implement a variety of routines, processes, and workflows in response to the receipt of an incoming call or message as monitored by the listener 410 to support the user experiences described above.

Various data handling functions are also supported by the caller identifier application 205 including receiving calls or messages $535_1$ and associated information such as call metadata $535_2$. The caller identifier application 205 will generally store call data, either on a temporary or persistent basis, as well as user preferences and usage histories $535_3$ in some cases. Other data handling may also be performed as indicated by reference number $535_N$, to meet the needs of a given usage scenario.

Figure 5:
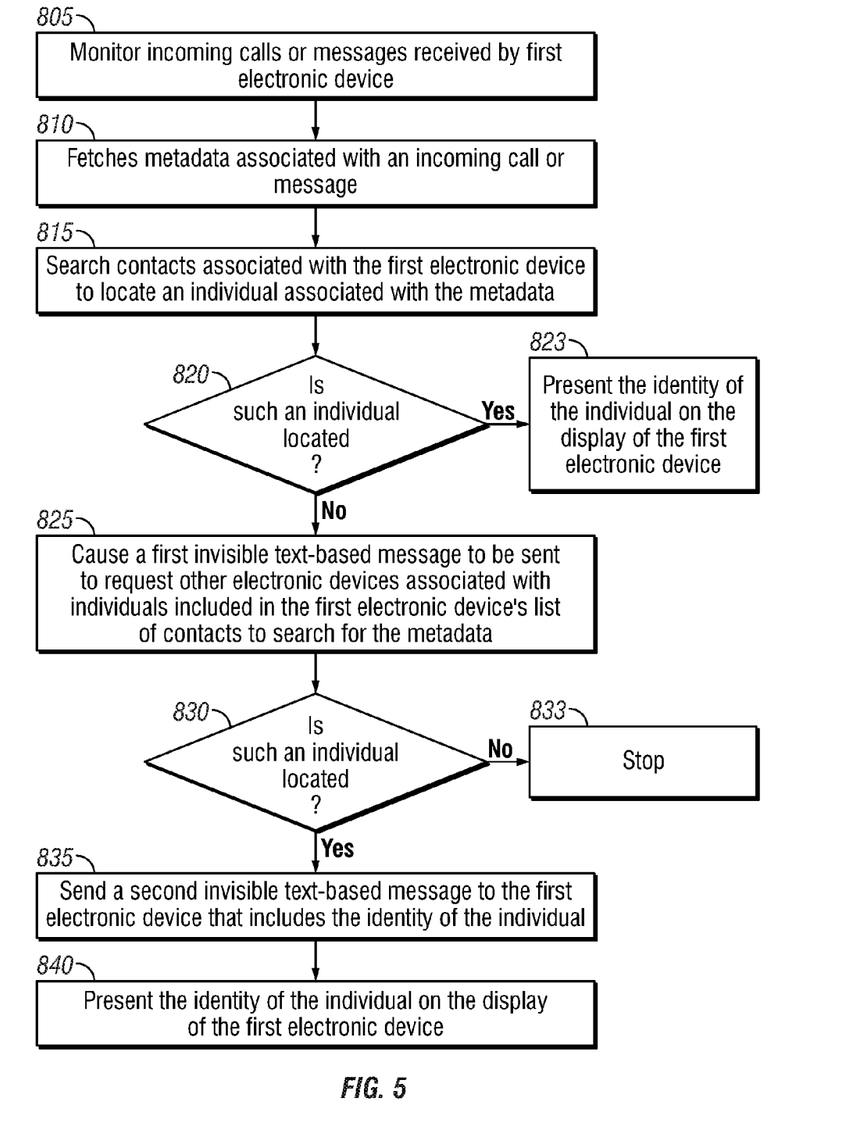
FIG. 5 is a flowchart of an illustrative workflow that may be utilized by the caller identifier application residing on a first network-enabled electronic device.

FIG. 5 is a flowchart of an illustrative workflow 800 that may be utilized by the caller identifier application 205 residing on a first network-enabled electronic device. The workflow begins at block 805 where the listener 410 monitors for incoming calls or messages received over a communications network by the electronic device from a sender. Next, at block 810, the call identifier application residing on the first electronic device fetches metadata associated with an incoming call or message, and at block 815, searches a list of contacts associated with the first electronic device to locate a given individual associated with the metadata. At decision block 820, if the given individual is located, the name or other identifier of the individual is presented to the user of the first electronic device at block 823, typically on the first electronic device's display. On the other hand, if no individual associated with the metadata is found, workflow control passes to block 825 where the caller identifier application 205 causes a first invisible text-based message to be sent to other electronic devices associated with at least some of the individuals included in the first electronic device's list of contacts. This may be accomplished, for example, by establishing a link with a text-based application residing on the electronic device through an API in order to send a message requesting the other electronic devices to search their respective contact lists to find an individual associated with the metadata. If at decision step 830 such an individual is not located, the process terminates at block 833, otherwise control passes to block 835 where the electronic device on which the individual was found sends to the first electronic device a second invisible text-based message that includes the identity (e.g., the name) of the individual. Finally, at block 840 the name or other identifier of the individual is presented to the user of the first electronic device, typically on the first electronic device's display.

Figure 6:
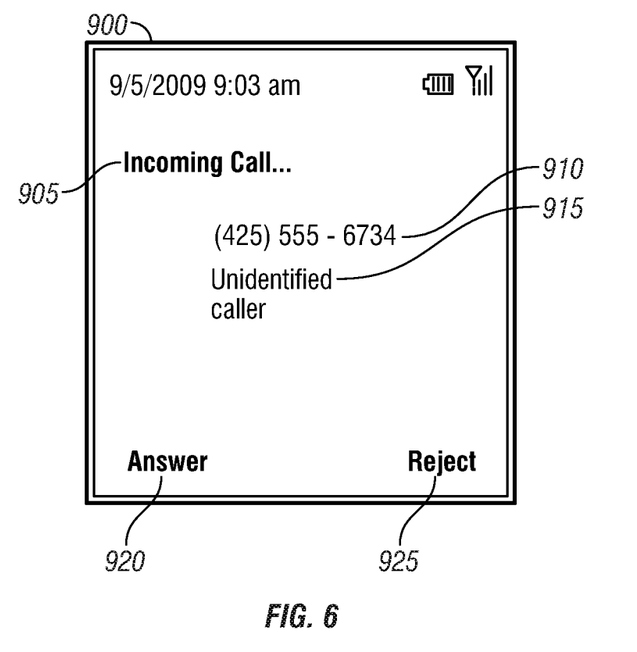
FIGS. 6-8 show various illustrative screenshots of the user interface that is supported by the caller identifier application.
Figure 7:
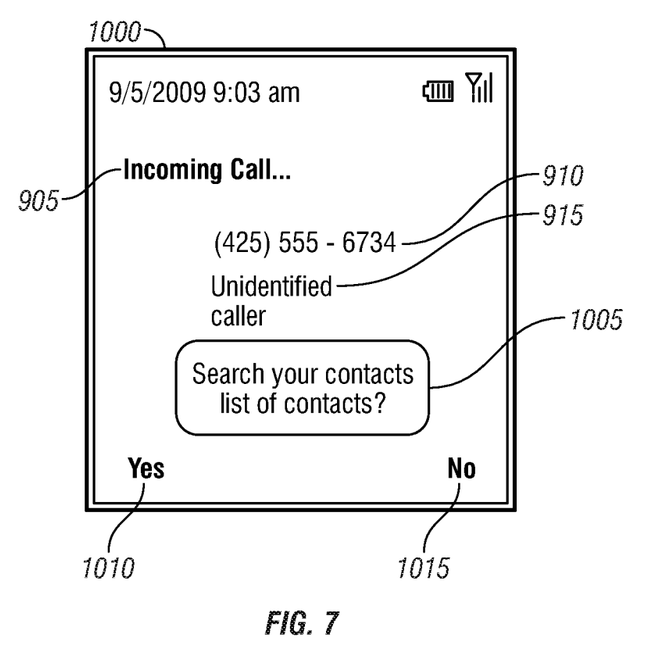
Figure 8:
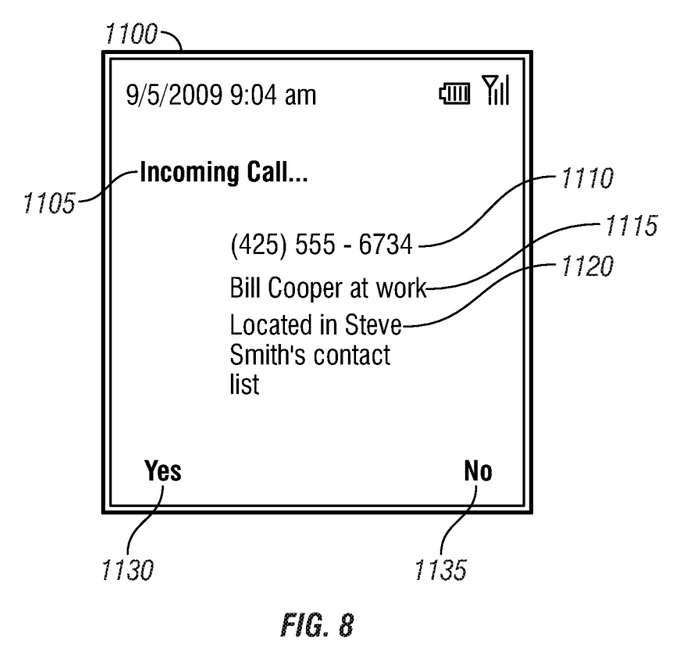

FIGS. 6-8 show various illustrative screenshots of one example of a UI that may be supported by the caller identifier application 205. Of course, the UI may be configured in a wide variety of different ways as well and is not limited to the example shown herein. FIG. 6 shows an exemplary screen shot 900 of the UI when an incoming call 905 is received at the mobile phone $115_1$. In this example, call data including the caller's phone number 910 and identity 915 (if known) is displayed. In this example, call handling is implemented in a typical manner by an application operating on the mobile phone $115_1$ which compares the incoming call data to the user's contact list in order to fetch and display the caller's identity. In alternative implementations such call handling functionality could be handled by the present caller identifier application 205. In either case, in this example the caller is not listed in the user's list of contacts and therefore the caller's identity is specified as unidentified or unknown.

The user is provided with the typical call handling options to either answer an incoming call or reject it by interfacing with the respective "Answer" or "Reject" buttons 920 and 925 which are displayed on the UI. Depending on the hardware configuration of the mobile phone $115_1$, buttons 920 and 925 can be implemented using touch sensitive graphic icons, "soft" keys on the phone, or other various conventional controls.

In accordance with the principles of the present arrangement, FIG. 7 shows an exemplary screenshot 1000 of the UI when a prompt 1005 is displayed upon launch of the caller identifier application 205 that is triggered by the incoming call 905. The prompt 1005 asks the user if the contact lists of his or her contacts should be searched. In some implementations, depending upon the user preferences $520_1$ that were established, the prompt may be eliminated and the application will automatically begin a search without prompting the user. When the prompt 1005 is displayed, buttons 1010 and 1015 are also displayed to enable the user to implement the contact search function as desired.

FIG. 8 shows an exemplary screenshot 1100 that shows the results after the caller identifier application 205 has performed a search on the caller's telephone number and has located the caller one of the contact's contact list. When such a caller is located, the caller identifier application will display the name 1115 and the name 1120 of the contact who provided the name from their contact list.

It is noted that for the sake of clarity and ease of illustration in the description above that data, applications, and other executable application components such as operating systems are shown as discrete blocks, boxes, or other elements although it is recognized and emphasized that such applications and components may reside at various times in different storage, memory, or processing components of any hardware host used, and are executed by one or more processors in such host hardware.

In the implementations described above an invisible text message is sent to the mobile phone of the user's contacts to identify an incoming caller. In some implementations however, the invisible text message may be sent to the user's contacts that are available from other data sources such as a social network (e.g., Facebook), for example. Such sources may maintain phone numbers for both the user's contacts and those contact's contacts, thus providing another source of information that may be used to identify an incoming caller. In addition to social networks, other data sources that may be used include mail clients such as Gmail, Microsoft Outlook® and Windows Live®. In this way a new social network is effectively created, consisting of the user, the user's contacts, and the contacts of the user's contacts. In this way the contact list available in the user's mobile device is transformed from a self-contained closed list, into an entire social network of individuals which has the ability to grow and extend to additional individuals.

The techniques described above are generally applicable to a wide variety of different mobile devices that are offered by various manufacturers. However, with some mobile devices, such as Windows Phones®, the search originates through the phone but is actually performed using a cloud-based (e.g., web) service. In particular, users of a Windows Phone® are enrolled into MyPhone® application (for example), which maintains the user's contacts from all sources on the web. Whenever a call from an unidentified number is intercepted, the search will be performed online (between the online phone's social graphs) instead of between phones in a peer-to-peer mode. That is, the search is performed between the phone and the MyPhone® cloud, which represents the aggregation of all the user's contacts from all possible social networks. Moreover, MyPhone® can extend the search into the cloud by searching not only the user's own cloud but also his contacts' associated social networks. For example, a contact from Facebook will be searched by MyPhone® in Facebook.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed on a computing device, the method comprising:

effectively expanding, by the computing device, a first contact list that comprises contacts to include at least a portion of at least one of the contacts' contact lists, where the first contact list is associated with a user of the computing device, where the effectively expanding is based on:
sending, by the computing device in response to receiving a first message from a first device, a second message to a second device that is associated with the at least one of the contacts, where the second message comprises a request for identity information that identifies a sender of the first message; and
receiving, by the computing device in response to the sending, the requested identity information.

2. The method of claim 1 where the first message is an incoming call.

3. The method of claim 1 where the sent request comprises a request to search a contact list associated with a user of the second device for the identity information.

4. The method of claim 1 where the sending is further in response to the identity information not being available in the first contact list.

5. The method of claim 1 where the sent second message is an invisible SMS message.

6. The method of claim 1 further comprising presenting, by the computing device, the received identity information.

7. The method of claim 1 further comprising presenting, by the computing device, a name of the at least one of the contacts from whose contact list the identity information was received.

8. A computing device comprising:
a processor;
memory coupled to the processor; and
an identifier application via which the computing device is configured to effectively expand a first contact list that comprises contacts to include at least a portion of at least one of the contacts' contact lists, where the first contact list is associated with a user of the computing device, where the first contact list is effectively expanding based on:
sending, in response to receiving a first message from a first device, a second message to a second device that is associated with the at least one of the contacts, where the second message comprises a request for identity information that identifies a sender of the first message; and
receiving, in response to the sending, the requested identity information.

9. The computing device of claim 8 where the first message is an incoming call.

10. The computing device of claim 8 where the sent request comprises a request to search a contact list associated with a user of the second device for the identity information.

11. The computing device of claim 8 where the sending is further in response to the identity information not being available in the first contact list.

12. The computing device of claim 8 where the sent second message is an invisible SMS message.

13. The computing device of claim 8 further configured via the identifier application to present the received identity information.

14. The computing device of claim 8 further configured via the identifier application to present a name of the at least one of the contacts from whose contact list the identity information was received.

15. At least one memory device that comprises computer-executable instructions that, based on execution by a processor of a computing device, configure the computing device to perform actions comprising:
effectively expanding, by the computing device, a first contact list that comprises contacts to include at least a portion of at least one of the contacts' contact lists, where the first contact list is associated with a user of the computing device, where the effectively expanding is based on:
sending, by the computing device in response to receiving a first message from a first device, a second message to a second device that is associated with the at least one of the contacts, where the second message comprises a request for identity information that identifies a sender of the first message; and
receiving, by the computing device in response to the sending, the requested identity information.

16. The at least one memory device of claim 15 where the first message is an incoming call.

17. The at least one memory device of claim 15 where the sent request comprises a request to search a contact list associated with the second device for the identity information.

18. The at least one memory device of claim 15 where the sending is further in response to the identity information not being available in the first contact list.

19. The at least one memory device of claim 15 where the sent second message is an invisible SMS message.

20. The at least one memory device of claim 15 further comprising presenting, by the computing device, the received identity information, or presenting, by the computing device, a name of the at least one of the contacts from whose contact list the identity information was received.

* * * * *